(12) United States Patent
Ballew et al.

(10) Patent No.: US 12,314,143 B2
(45) Date of Patent: May 27, 2025

(54) INTELLIGENT MERGE OF PRIMARY AND BACKUP DATA

(71) Applicant: CenturyLink Intellectual Property LLC, Broomfield, CO (US)

(72) Inventors: Dean Ballew, Sterling, VA (US); John R. B. Woodworth, Amissville, VA (US)

(73) Assignee: CenturyLink Intellectual Property LLC, Denver, CO (US)

( * ) Notice: Subject to any disclaimer, the term of this patent is extended or adjusted under 35 U.S.C. 154(b) by 56 days.

(21) Appl. No.: 18/329,320

(22) Filed: Jun. 5, 2023

(65) Prior Publication Data

US 2023/0393952 A1 Dec. 7, 2023

Related U.S. Application Data

(60) Provisional application No. 63/365,953, filed on Jun. 7, 2022.

(51) Int. Cl.
*G06F 11/14* (2006.01)
*G06F 11/20* (2006.01)

(52) U.S. Cl.
CPC ...... *G06F 11/1469* (2013.01); *G06F 11/2082* (2013.01); *G06F 2201/84* (2013.01)

(58) Field of Classification Search
CPC ............. G06F 11/1402; G06F 11/1463; G06F 11/1471; G06F 11/1446; G06F 11/202–2041; G06F 11/2048; G06F 11/2082; G06F 11/3006
See application file for complete search history.

(56) References Cited

U.S. PATENT DOCUMENTS

| | | | | |
|---|---|---|---|---|
| 9,632,892 | B1 * | 4/2017 | Sledz | G06F 11/1443 |
| 11,200,207 | B1 * | 12/2021 | Lew | G06F 11/1451 |
| 2015/0363282 | A1 * | 12/2015 | Rangasamy | G06F 11/2033 714/4.12 |
| 2018/0060191 | A1 * | 3/2018 | Goodman | G06F 3/0619 |
| 2019/0377647 | A1 * | 12/2019 | Rao | G06F 16/273 |
| 2020/0084273 | A1 * | 3/2020 | Dhananjay | H04L 67/1097 |

FOREIGN PATENT DOCUMENTS

CN 102023907 A * 4/2011

* cited by examiner

*Primary Examiner* — Yolanda L Wilson (57) ABSTRACT

In a distributed replicated storage system, an active server may, during normal operation, service requests from clients, and back up its persistent storage to a backup server. The backup server may be configured to become an active server autonomously if the active server fails. If a network connection between the active server and the backup server fails, severing the connection between the active server and the backup server, the backup server may become a second active server and begin to service requests from clients, and the original active server may continue to service requests from clients. This may result in inconsistencies in the persistent storage of the original active server and of the second active server. As such, a system and method for intelligent merging of primary and backup data in a distributed replicated storage system are provided.

16 Claims, 8 Drawing Sheets

INTELLIGENT MERGE OF PRIMARY AND BACKUP DATA

CROSS-REFERENCE TO RELATED APPLICATIONS

This application claims the benefit of U.S. Provisional Application No. 63/365,953 filed Jun. 7, 2022, entitled "Intelligent Merge of Primary and Backup Data," which is incorporated herein by reference in its entirety.

FIELD

One or more aspects of examples according to the present disclosure relate to storage systems, and more particularly to a system and method for intelligent merging of primary and backup data in a distributed replicated storage system.

BACKGROUND

In a distributed replicated storage system, an active server may, during normal operation, service requests from clients, and back up its persistent storage to a backup server. The backup server may be configured to become an active server autonomously if the active server fails. If a network connection between the active server and the backup server fails, severing the connection between the active server and the backup server, the backup server may become a second active server and begin to service requests from clients, and the original active server may continue to service requests from clients. This may result in inconsistencies in the persistent storage of the original active server and of the second active server.

It is with respect to this general technical environment that aspects of the present disclosure are related.

SUMMARY

A system and method for intelligent merging of primary and backup data in a distributed replicated storage system is provided. In an aspect, a method includes detecting, by a first server, a loss of a connection from the first server to a second server; writing data, by the first server, to a first block of a first region of persistent storage of the first server, in response to a service request from a client; storing, by the first server, in a second region of persistent storage of the first server, a snapshot of the first region of persistent storage; overwriting a second block of the first region of persistent storage with data from the second server; and mounting, via a file system, the snapshot.

In another aspect, the present application discloses system comprising a first server. In examples, the first server comprises: a processing circuit; persistent storage; and memory, operatively connected to the processing circuit and storing instructions that, when executed by the processing circuit, cause the first server to perform a method. In examples, the method comprises: detecting a loss of a connection from the first server to a second server; writing data, by the first server, to a first block of a first region of the persistent storage of the first server, in response to a service request from a client; storing, by the first server, in a second region of the persistent storage of the first server, a snapshot of the first region; overwriting a second block of the first region of the persistent storage with data from the second server; and mounting the snapshot.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

These and other features and advantages of the present disclosure will be appreciated and understood with reference to the specification, claims, and appended drawings. Non-limiting and non-exhaustive examples are described with reference to the following Figures.

DETAILED DESCRIPTION

The detailed description set forth below in connection with the appended drawings is intended as a description of exemplary embodiments of a system and method for intelligent merging of primary and backup data in a distributed replicated storage system provided in accordance with the present disclosure and is not intended to represent the only forms in which the present disclosure may be constructed or utilized. The description sets forth the features of the present disclosure in connection with the illustrated examples. It is to be understood, however, that the same or equivalent functions and structures may be accomplished by different examples that are also intended to be encompassed within the scope of the disclosure. As denoted elsewhere herein, like element numbers are intended to indicate like elements or features.

Figure 1:
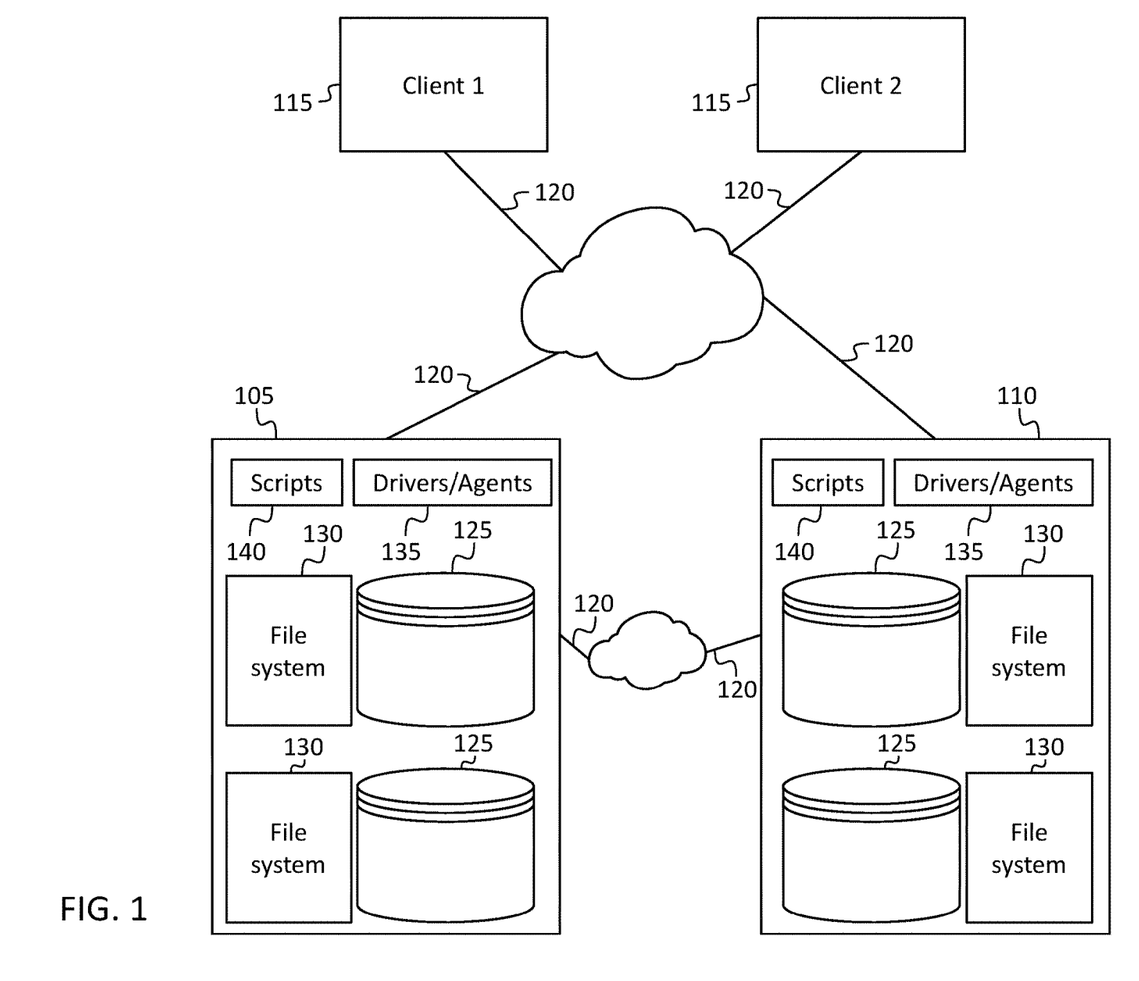
FIG. 1 is a block diagram of a distributed replicated storage system and two clients, according to an example of the present disclosure.

FIG. 1 shows an example of a distributed replicated storage system (such as a Distributed Replicated Block Device (DRBD) system). The system includes a first server 105, a second server 110, one or more clients 115, and a plurality of network connections 120 connecting the clients 115 (e.g., "client 1" and "client 2") to the first server 105 and to the second server 110, and connecting the first server 105 to the second server 110. In normal operation, the first server 105, for example, may operate as an active server and may respond to service requests from clients (e.g., one or more applications running on (the operating system of) the first server 105 may process client service requests and send responses), periodically writing data to persistent storage of the first server 105 in connection with responding to the service requests. The first server 105 and the second server 110 may operate in a primary-backup relationship, with the second server 110 operating as a backup, or "standby" server for the first server 105. The first server 105 may periodically, as part of the process of responding to service requests from clients, back up, or "mirror" the contents of its persistent storage to the second server 110.

Each of the first server 105 and the second server 110 may be aware of the other's continued normal operation as a result of a periodic signal or "heartbeat" signal exchanged between them. When the first server 105 does not receive a heartbeat signal during some time interval (e.g., one minute), it may assume that the second server 110 has become inoperable (e.g., that the second server 110 has failed or become disconnected from the network). Similarly, if the second server 110 does not receive a heartbeat signal during some time interval (e.g., one minute), it may assume that the first server 105 has become inoperable. If the first server 105 becomes inoperable, the second server 110 may promote itself to operating as the active server, and may begin servicing requests from clients (by advertising the same (e.g., virtual) Internet Protocol (IP) address that the first server 105 was advertising during normal operation). If the second server 110 becomes inoperable, the first server 105 may continue to service requests from clients (while no longer backing up its persistent storage to the second server 110). In either case, service to the clients may continue until a replacement for the failed server is put into service.

The persistent storage on each of the first server 105 and the second server 110 may include one or more storage devices 125, each managed by an operating system component that may be referred to as a file system 130. Storage in the storage devices 125 may be organized into blocks having a fixed size (e.g., 512 bytes); the file system 130 may manage these blocks and provide an interface through which other components of the operating system, and applications running on the operating system, may store and retrieve files, each of which may consist of one or more blocks (which, for any given file, need not be contiguous in the storage device 125). The file system 130 may keep a record of the date and time at which each block was most recently modified. The backing up of the first server 105 to the second server 110 may be performed at the block level (e.g., not at the file level), e.g., using a suitable driver 135 (which may be a DRBD driver, or "DRBD agent"). As such, in some examples, when the second server 110 is operating as the backup server, the persistent storage of the backup server may not be mounted; this persistent storage may be mounted only when the backup server becomes the active server, and at that time any applications needed to service requests from clients may be launched. As used herein, "mounting" is a process by which the file system makes files and directories in a region of persistent storage available for applications and processes to access.

If a network failure causes the connection between the first server 105 and the second server 110 to be severed while leaving intact at least some connections (i) between the clients 115 and the first server 105 and (ii) between the clients 115 and the second server 110, then a condition that may be referred to as "split brain" may occur. Each of the first server 105 and the second server 110 may cease to receive the heartbeat signal from the other. In response, the first server 105 may, as mentioned above, continue to service requests from clients (while no longer backing up its persistent storage to the second server 110), periodically writing data to the persistent storage of the first server 105 in connection with responding to the service requests. The second server 110 may begin also servicing requests from clients, also periodically writing data, to the persistent storage of the second server 110, in connection with responding to the service requests. In this condition, which may be referred to as "dual active server operation", each of the first server 105 and the second server 110 is operating as an active server (e.g., advertising the same virtual IP address); as a result, the contents of the persistent storage of the first server 105 may become inconsistent with the contents of the persistent storage of the second server 110.

When the network connection between the first server 105 and the second server 110 is restored, an arbitration mechanism may be employed to determine which, of (i) the data in the persistent storage of the first server 105 and (ii) the data in the persistent storage of the second server 110 is to be preserved, and which is to be discarded. The arbitration mechanism may take into account, for example, (i) which server performed the most recent write operation to persistent storage, or (ii) which server performed the largest number of write operations, or write operations affecting the largest volume of data, during the interval of dual active server operation.

The region of the persistent storage of the active server that is backed up to the backup server may be referred to as the "replicated data region" of the persistent storage of the active server; similarly the region, of the persistent storage of the backup server, that is allocated for backing up of the data of the active server may be referred to as the "replicated data region" of the persistent storage of the backup server. Once it is determined which of the first server 105 and the second server 110 stores the data that is to be preserved (this server may be referred to as the "surviving" server), the contents of the replicated data region of the surviving server may be overwritten over the contents of the replicated data region of the other server (which may be referred to as a the "non-surviving" server). For example, the blocks in the replicated data region of the surviving server that were modified during the interval of dual active server operation are overwritten onto the corresponding blocks of the non-surviving server, and any blocks that were modified in the replicated data region of the non-surviving server during the interval of dual active server operation, for which the corresponding blocks on the surviving server were not modified during the interval of dual active server operation, are overwritten with the corresponding (unmodified) blocks from the surviving server. If the surviving server is the server that was the backup server prior to the interval of dual active server operation, then it may become the active server, and the other server may become the backup server (otherwise, the roles of the servers may remain the same as they were prior to the interval of dual active server operation), and the system may then resume normal operation. The backup server may then go off-line, un-mount the persistent storage, and operate only as a block-level backup system for the active server.

This method of restoring normal operation after an interval of dual active server operation may have the advantage of restoring normal operation relatively quickly; it may have the disadvantage, however, that data may be lost on the non-surviving server. Accordingly, in some examples, a snapshot of a region of the persistent storage of the non-surviving server may be saved before the persistent storage of the non-surviving server is overwritten with the contents of the persistent storage of the surviving server. The replicated data region may be, for example, a storage device 125, or a partition of a storage device 125. As used herein, a "snapshot" of a region of persistent storage is, for example, a copy of the data that was stored in the region of persistent storage at a point in time (the point in time at which the snapshot was created). Each unit of data (e.g., each block) in the snapshot may be stored (i) explicitly or (ii) implicitly, as a pointer to another location in persistent storage containing the unit of data.

Figure 2A:
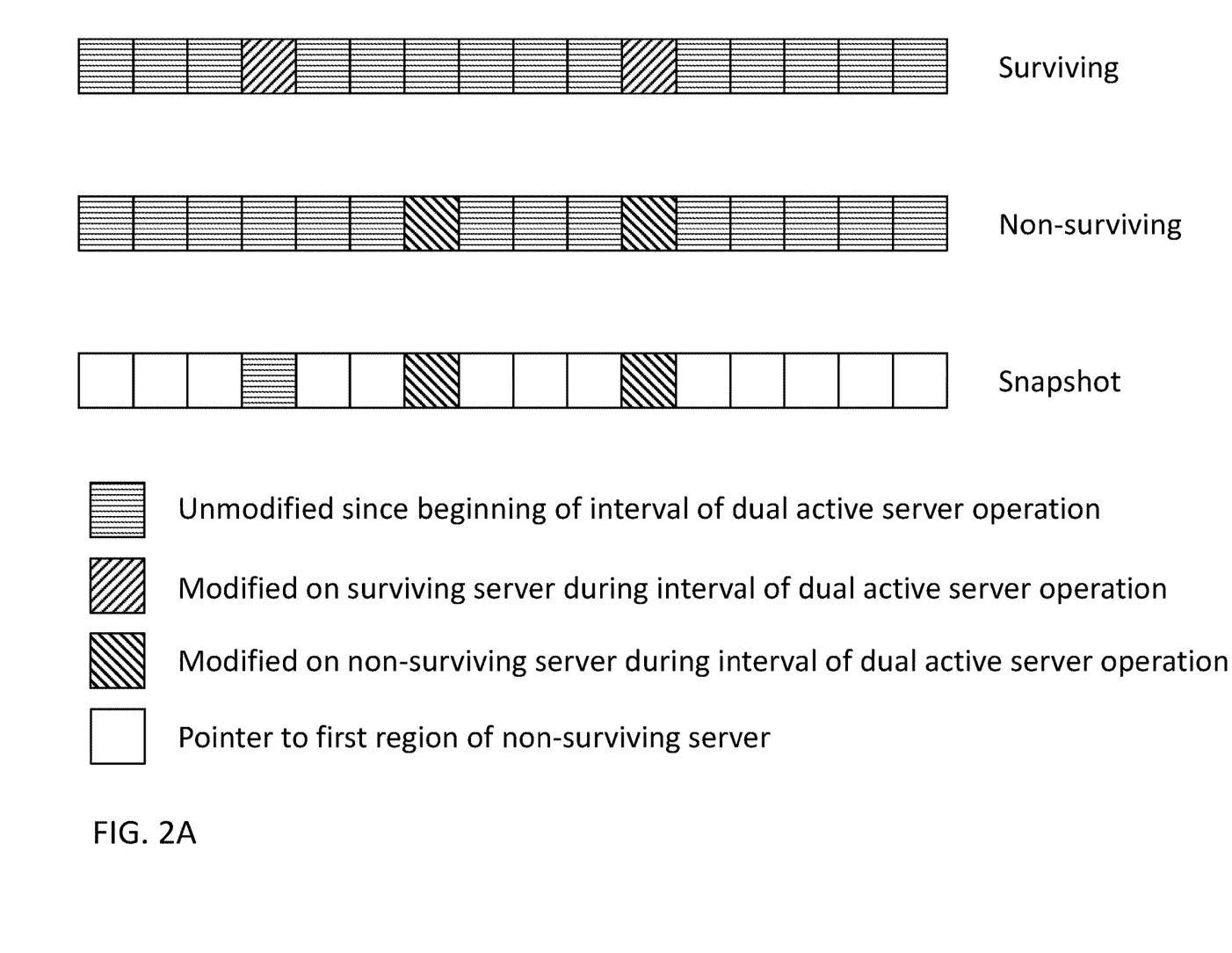
FIG. 2A is a data layout diagram, according to an example of the present disclosure.
Figure 2B:
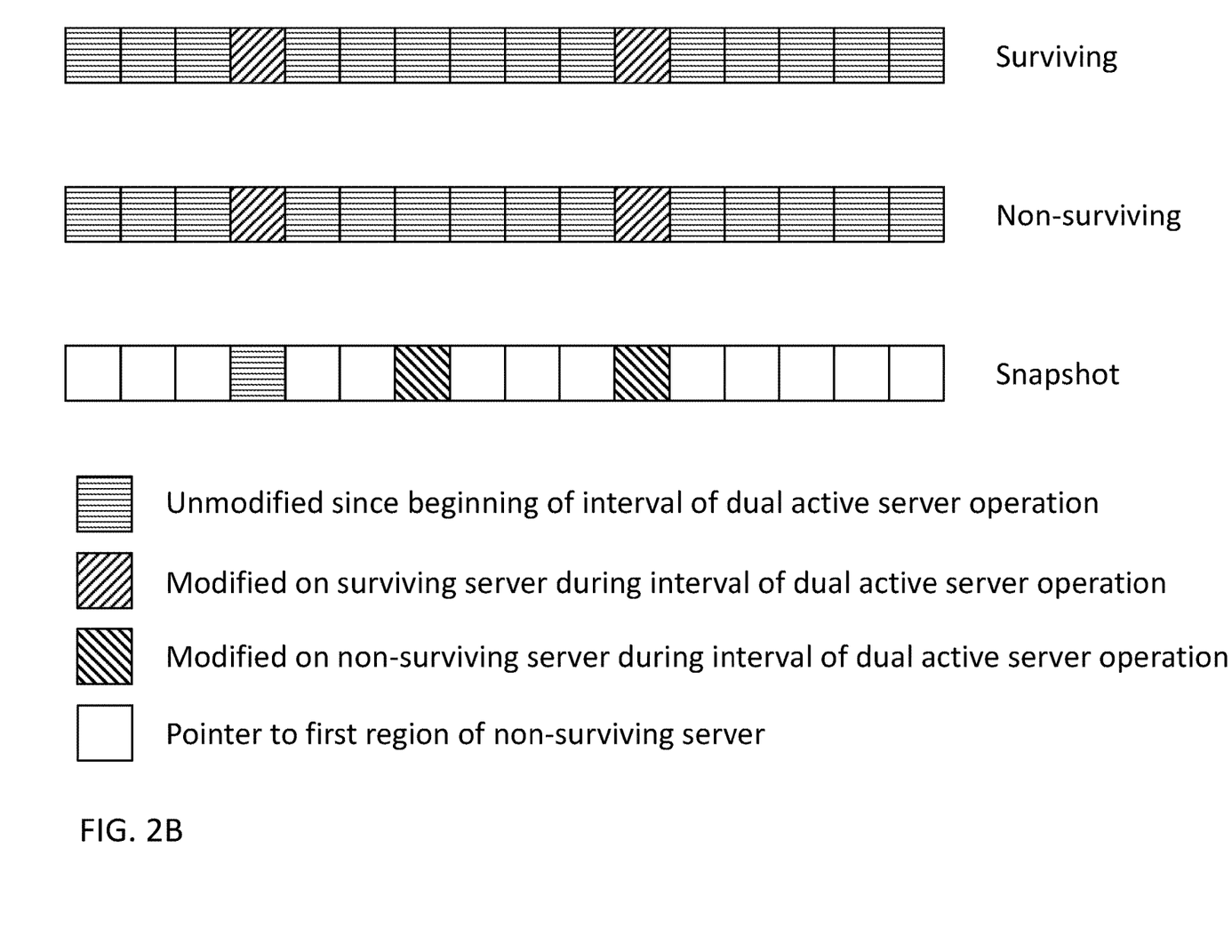
FIG. 2B is a data layout diagram, according to an example of the present disclosure.
Figure 2C:
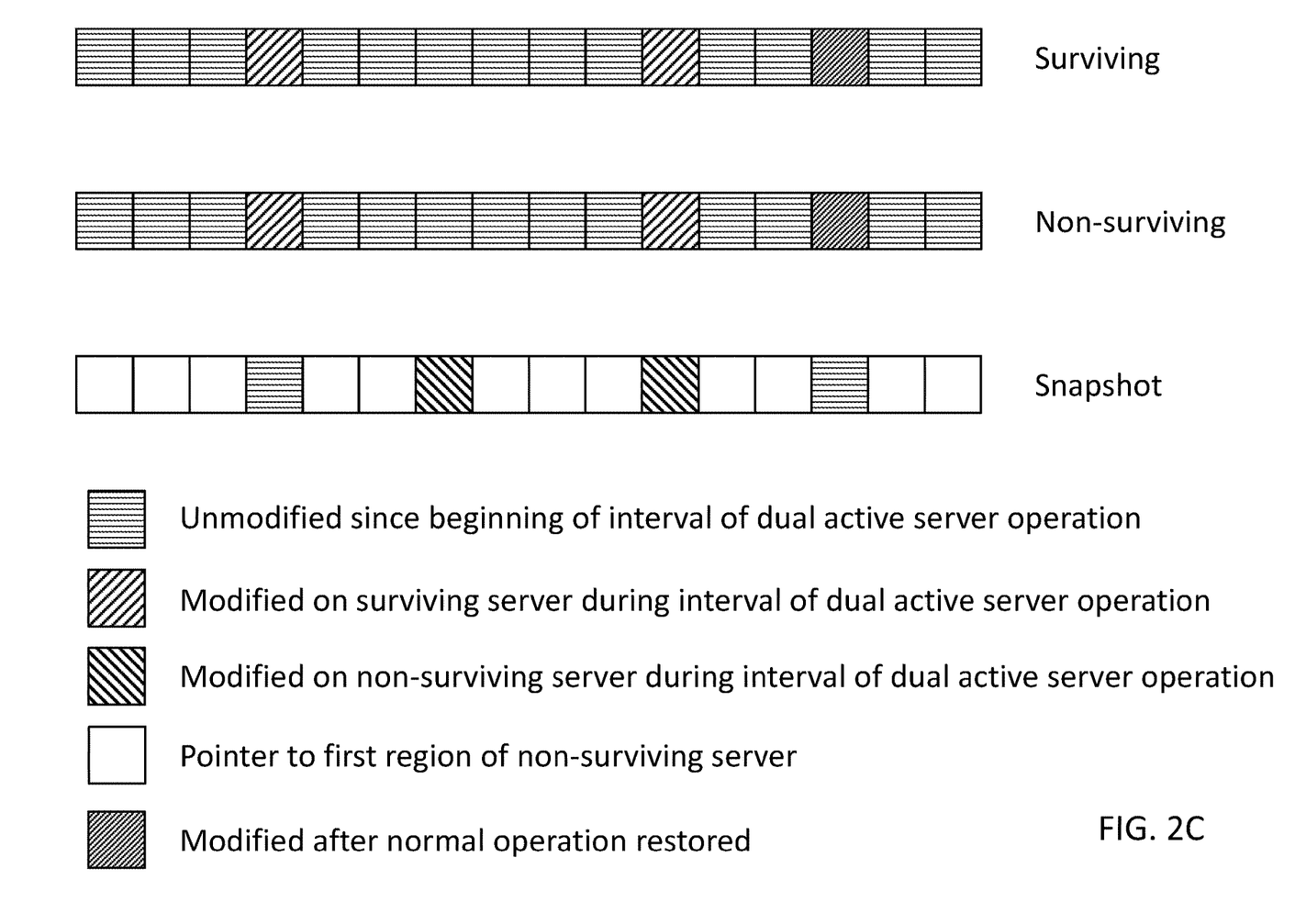
FIG. 2C is a data layout diagram, according to an example of the present disclosure.

The snapshot may be stored in a region of the non-surviving server's persistent storage (which may be referred to as the "snapshot region") that is separate from the replicated data region, e.g., on a separate storage device from the replicated data region, or on a separate partition from the replicated data region. The snapshot may contain a copy of each block that was overwritten when normal operation was restored (i.e., a copy of each block that was modified, during the interval of dual active server operation, in the replicated data region of the non-surviving server, and an unmodified copy of each block, in the replicated data region of the non-surviving server, the block corresponding to which was modified on the surviving server during the interval of dual active server operation). The remainder of the snapshot may include a set of pointers to corresponding blocks of the replicated data region of the non-surviving server. Pointers may be employed in this manner to reduce the space occupied by the snapshot and the time required to create the snapshot. FIG. 2A shows, for one example, the contents of (i) a portion (16 blocks) of the replicated data region of the surviving server, of (ii) a portion of the replicated data region of the non-surviving server, and of (iii) a portion of the snapshot, showing, as indicated by the legend of FIG. 2A, blocks that have remained unmodified since the beginning of the interval of dual active server operation (the contents of which are the same on the surviving server and on the non-surviving server, and for which a pointer may be employed in the snapshot), blocks that were modified on the surviving server during the interval of dual active server operation, and blocks that were modified on the non-surviving server during the interval of dual active server operation. FIG. 2B shows the contents of the portions after the contents of the surviving server have been copied over the contents of the non-surviving server. As operation continues, after normal operation is restored, one or more of the pointers in the snapshot may be replaced with the contents of blocks about to be overwritten, when backup operations require the overwriting of additional blocks in the replicated data region of the non-surviving server. This is shown, in an example, in FIG. 2C.

The snapshot may then be mounted, by the non-surviving server. The mounting of the snapshot may make it possible to access the data in the snapshot as files (instead of accessing the data on the block level), making feasible various comparison and merge operations that would be challenging to perform on the block level. For example, a user may use a suitable script 140 to perform a comparison of two versions of a file (e.g., of a log file), the current version (stored on the surviving server) and the version in the snapshot, to identify, for example, one or more portions that were added to the file, by the first server 105 or by the second server 110, during the interval of dual active server operation. In this manner, the user may identify, for example, log file entries made by the non-surviving server during the interval of dual active server operation. The user may then preserve these entries by copying them into the log file on the surviving server. In some circumstances the user may instead use a suitable script 140 or other software tool (e.g., a tool that combines all of the entries in the two files, removes duplicates, and sorts them in time order) to merge the two versions of the log file. In some examples, the entire process may be automated, e.g., for certain categories of files such as log files. For example, after normal operation is restored, an automated process may merge the two versions of each log file on the system and save the merged version over the version on the surviving server.

In some examples the processing (e.g., the comparing or merging of files in the snapshot) is performed on the non-surviving server (using remote access (e.g., via File Transfer Protocol (ftp) or Secure Copy (scp)) to the files on the surviving server); in other examples the processing of the snapshot is performed on the surviving server (using remote access (e.g., via ftp or scp to the non-surviving server) to the files in the snapshot). The use of a snapshot as described above may make it possible to restore normal operation quickly (by overwriting the persistent storage of the non-surviving server with the contents of the persistent storage of the surviving server, without attempting to resolve inconsistencies) while preserving the ability to resolve inconsistencies e.g., by merging the contents of different versions of files as discussed above, after the system has been restored to normal operation.

Figure 3A:
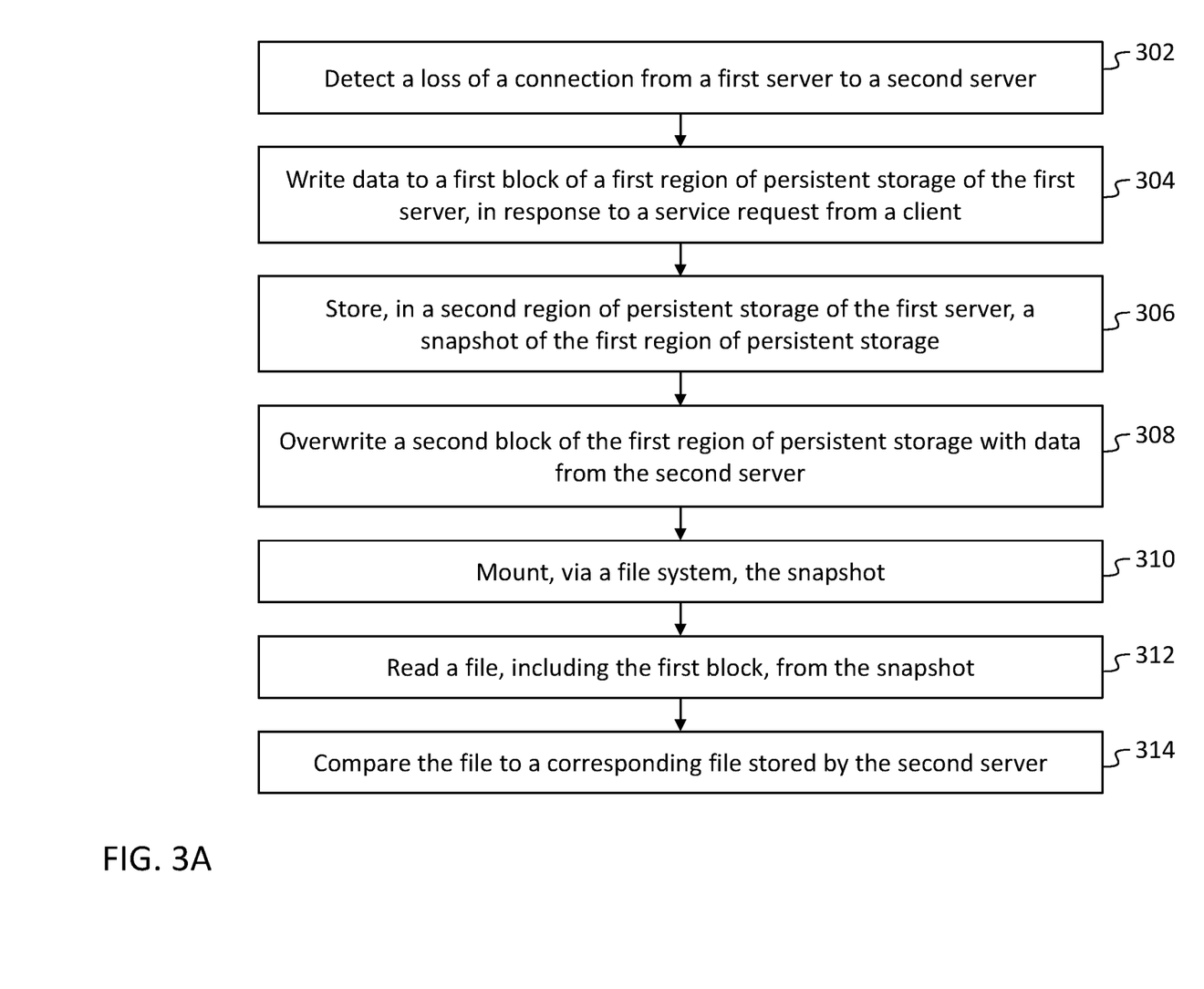
FIG. 3A is a flow chart of a method, according to an example of the present disclosure.
Figure 3B:
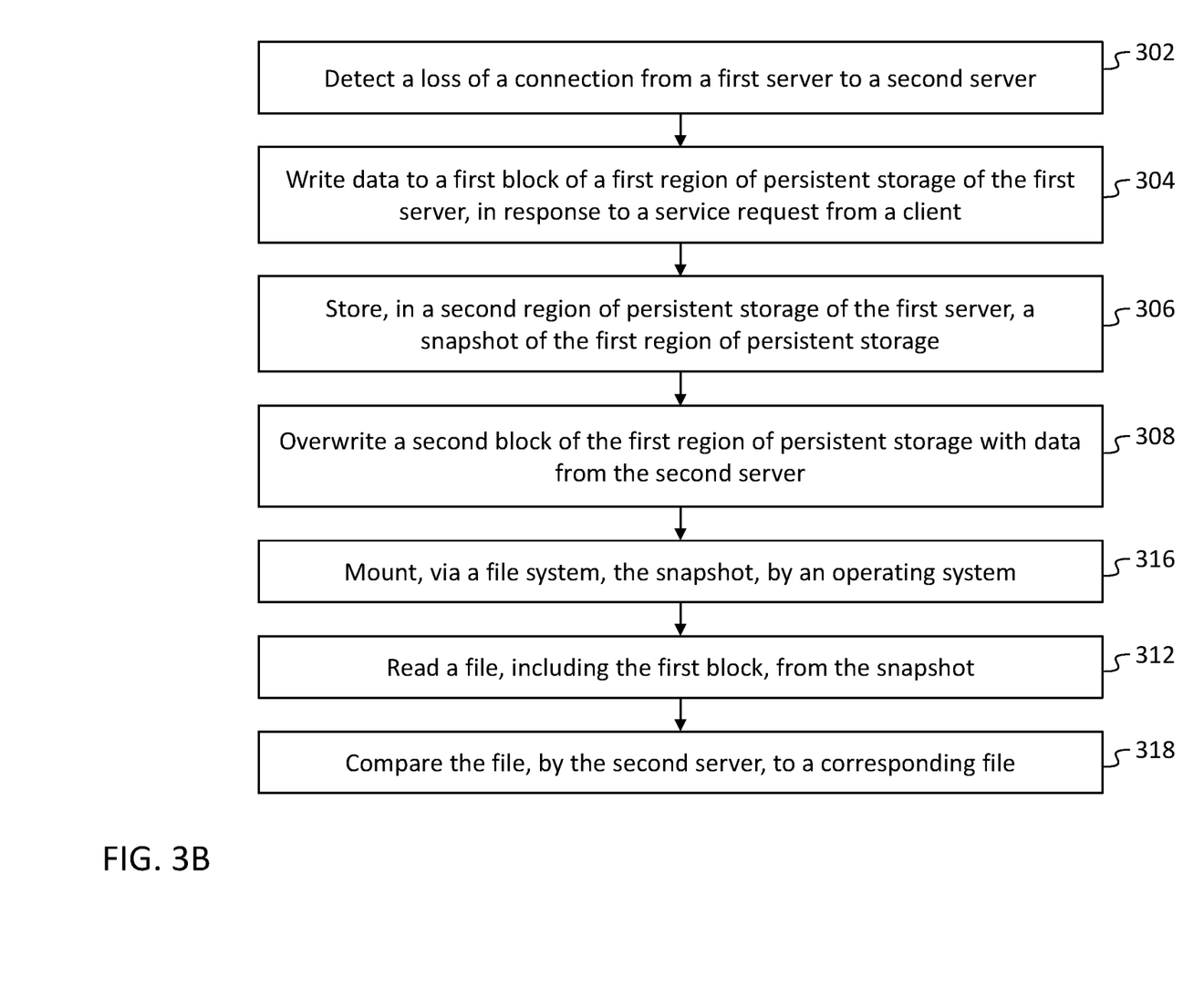
FIG. 3B is a flow chart of a method, according to an example of the present disclosure.
Figure 3C:
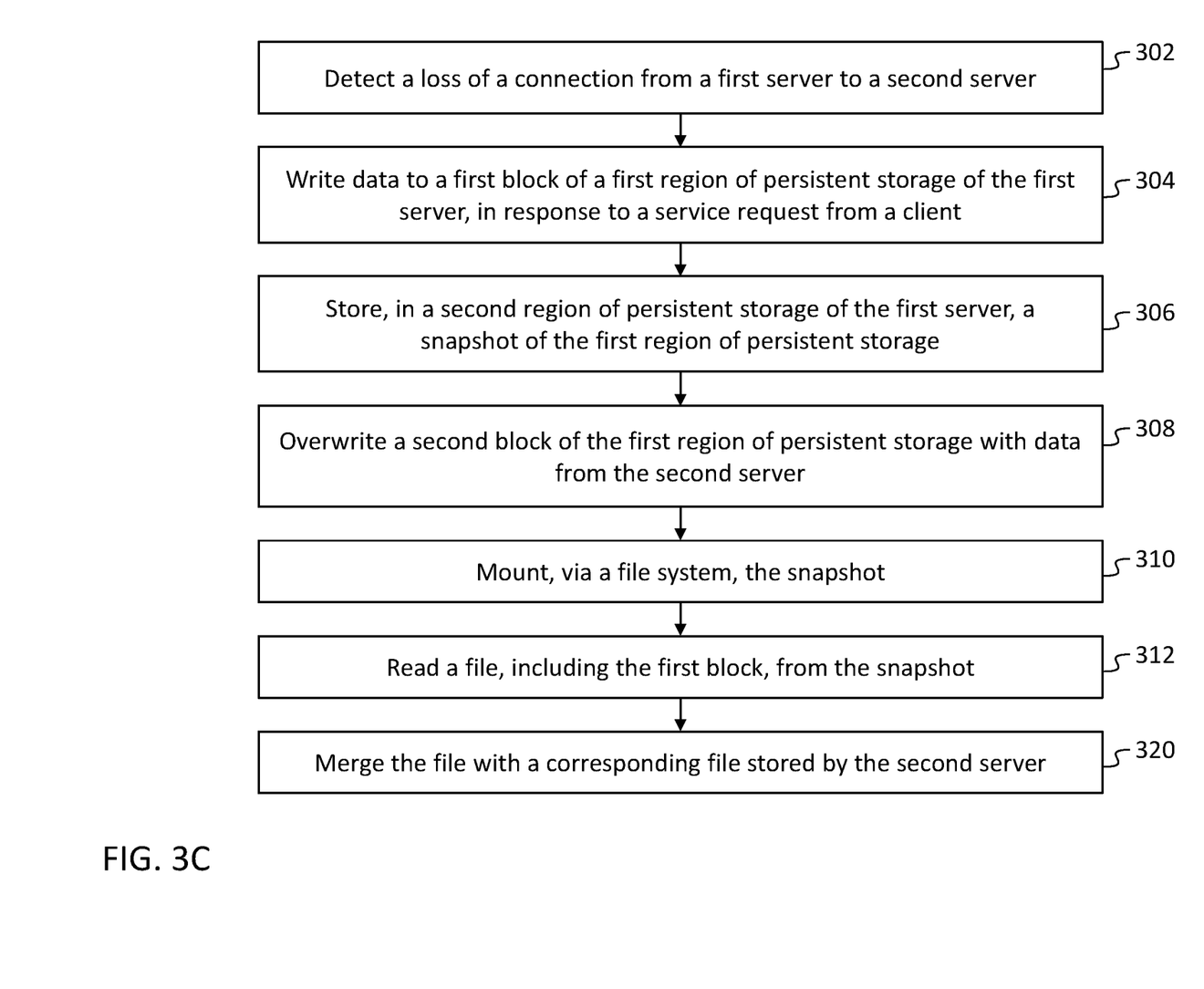
FIG. 3C is a flow chart of a method, according to an example of the present disclosure.

FIGS. 3A-3C are flowcharts of methods according to some examples described herein. Referring to FIG. 3A, in some examples, a loss of a connection from a first server to a second server is detected, at 302; data is written, at 304, to a first block of a first region of persistent storage of the first server, in response to a service request from a client; a snapshot of the first region of persistent storage is stored, at 306, in a second region of persistent storage of the first server; a second block of the first region of persistent storage is overwritten, at 308, with data from the second server; and the snapshot is mounted, at 310, via a file system. The method may further include reading, at 312, a file including the first block, from the snapshot; and comparing, at 314, the file to a corresponding file stored by the second server. Referring to FIG. 3B, in some examples, the mounting (at 310, in FIG. 3A) of the snapshot via a file system may include mounting, at 316, the snapshot by an operating system of the first server, and the comparing (at 314, in FIG. 3A), of the file to a corresponding file stored by the second server may include comparing the file, at 318, by the second server, to the corresponding file. Referring to FIG. 3C, in some examples, the method includes, after reading, at 312, a file including the first block, from the snapshot, merging the file, at 320, with a file stored by the second server. The merging may be performed by the first server or by the second server.

Figure 4:
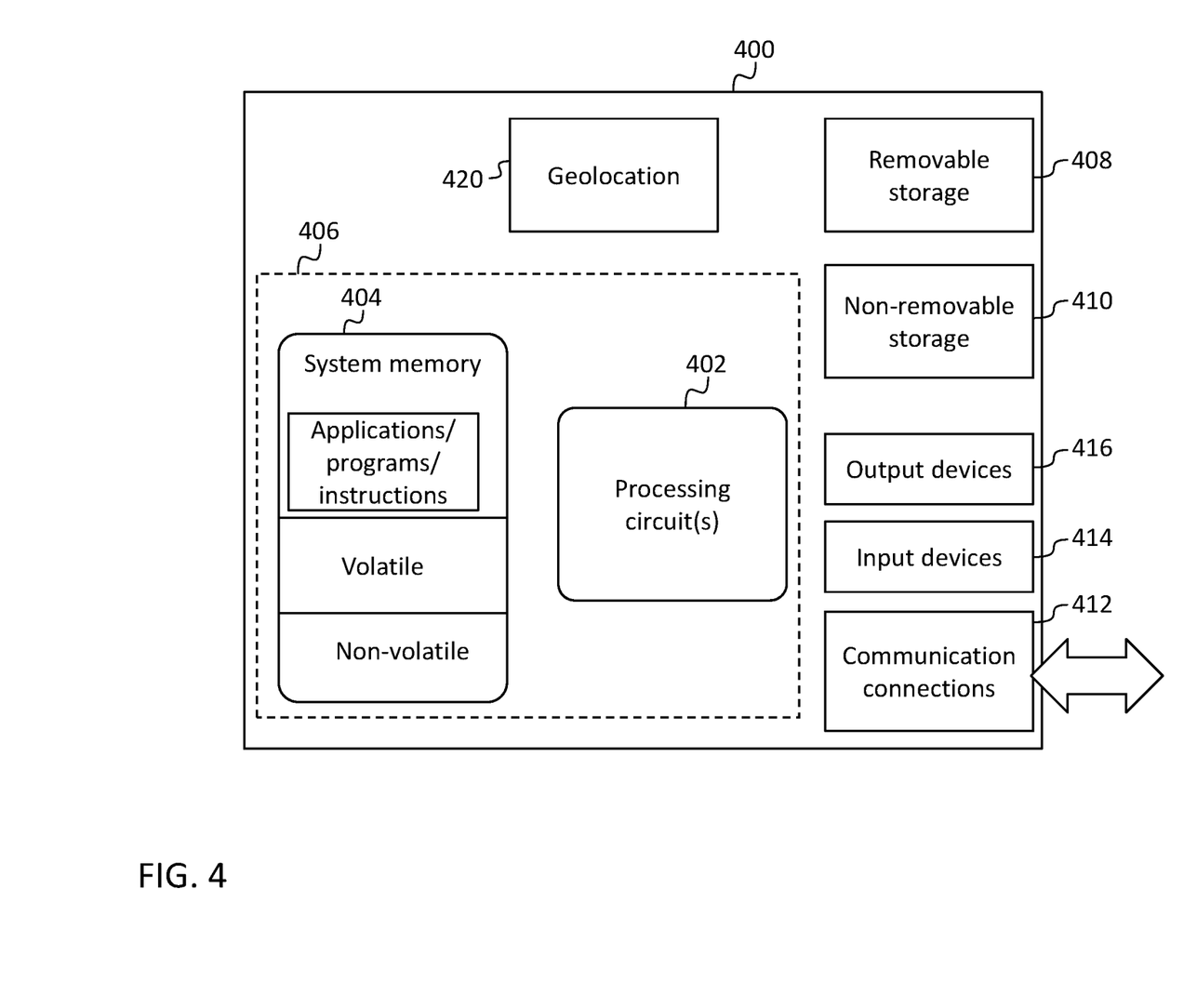
FIG. 4 is an operating environment, according to an example of the present disclosure.

FIG. 4 depicts an example of a suitable operating environment 400, portions of which may be used to implement the first server 105, the second server 110, the clients 115, a user computing device, or other computing devices within the systems discussed herein. In its most basic configuration, operating environment 400 typically includes at least one processing circuit 402 and memory 404. The processing circuit may be a processor, which is hardware. Depending on the exact configuration and type of computing device, memory 404 (storing instructions to perform the methods disclosed herein) may be volatile (such as RAM), non-volatile (such as ROM, flash memory, etc.), or some combination of the two. This most basic configuration is illustrated in FIG. 4 by dashed line 406. The memory 404 stores instructions that, when executed by the processing circuit(s) 402, perform the processes and operations described herein. Further, environment 400 may also include storage (removable 408, or non-removable 410) including, but not limited to, solid-state, magnetic disks, optical disks, or tape. Similarly, environment 400 may also have input device(s) 414 such as keyboard, mouse, pen, voice input, etc., or output device(s) 416 such as a display, speakers, printer, etc. Additional communication connections 412 may also be included that allow for further communication with LAN, WAN, point-to-point, etc. Operating environment 400 may also include geolocation devices 420, such as a global positioning system (GPS) device.

Operating environment 400 typically includes at least some form of computer readable media. Computer readable media can be any available media that can be accessed by processing circuit 402 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media is non-transitory and tangible and does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, microwave, and other wireless media. Combinations of any of the above should also be included within the scope of computer readable media.

As used herein, the word "or" is inclusive, so that, for example, "A or B" means any one of (i) A, (ii) B, and (iii) A and B. As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to generating suggested queries, may be operated via application-specific logic integrated with other components of the operating environment 400 on the single integrated circuit (chip). Examples of the present disclosure may also be practiced using other technologies capable of performing logical operations such as, for example, AND, OR, and NOT, including but not limited to mechanical, optical, fluidic, and quantum technologies.

Although exemplary embodiments of a system and method for intelligent merging of primary and backup data in a distributed replicated storage system have been specifically described and illustrated herein, many modifications and variations will be apparent to those skilled in the art. Accordingly, it is to be understood that a system and method for intelligent merging of primary and backup data in a distributed replicated storage system constructed according to principles of this disclosure may be embodied other than as specifically described herein. The invention is also defined in the following claims, and equivalents thereof.

What is claimed is:

1. A method, comprising:
    detecting, by a first server, a loss of a connection from the first server to a second server;
    writing data, by the first server, to a first block of a first region of persistent storage of the first server, in response to a service request from a client;
    storing, by the first server, in a second region of persistent storage of the first server, a snapshot of the first region of persistent storage;
    reading a file comprising the first block from the snapshot;
    comparing the file to a corresponding file stored by the second server;
    overwriting a second block of the first region of persistent storage with data from the second server; and
    mounting, via a file system, the snapshot.

2. The method of claim 1, wherein the mounting of the snapshot comprises mounting the snapshot by an operating system of the first server.

3. The method of claim 1, wherein the comparing comprises comparing the file, by the second server, to the corresponding file.

4. The method of claim 1, further comprising merging the file with a corresponding file stored by the second server, to generate a merged file.

5. The method of claim 4, wherein the merging comprises merging the file, by the second server, with the corresponding file.

6. The method of claim 4, wherein the merging comprises merging the file, by the first server, with the corresponding file.

7. The method of claim 4, wherein the snapshot is a copy of the data stored in the first region of persistent storage of the first server at the time of creation of the snapshot.

8. The method of claim 1, wherein the first server and the second server are part of a Distributed Replicated Block Device (DRBD) system.

9. A system, comprising:
a first server comprising:
a processing circuit;
persistent storage; and
memory, operatively connected to the processing circuit and storing instructions that, when executed by the processing circuit, cause the first server to perform a method, the method comprising:
detecting a loss of a connection from the first server to a second server;
writing data, by the first server, to a first block of a first region of the persistent storage of the first server, in response to a service request from a client;
storing, by the first server, in a second region of the persistent storage of the first server, a snapshot of the first region;
reading a file comprising the first block, from the snapshot;
comparing the file to a corresponding file stored by the second server
overwriting a second block of the first region of the persistent storage with data from the second server; and
mounting the snapshot.

10. The system of claim 9, wherein the mounting of the snapshot comprises mounting the snapshot by an operating system of the first server.

11. The system of claim 9, wherein the comparing comprises comparing the file, by the second server, to the corresponding file.

12. The system of claim 9, wherein the method further comprises merging the file with a corresponding file stored by the second server, to generated a merged file.

13. The system of claim 12, wherein the merging comprises merging the file, by the second server, with the corresponding file.

14. The system of claim 12, wherein the merging comprises merging the file, by the first server, with the corresponding file.

15. The system of claim 12, wherein the snapshot is a copy of the data stored in the first region of persistent storage of the first server at the time of creation of the snapshot.

16. The system of claim 9, wherein the first server and the second server are part of a Distributed Replicated Block Device (DRBD) system.

* * * * *